(12) United States Patent
Lorie

(10) Patent No.: US 6,577,755 B1
(45) Date of Patent: Jun. 10, 2003

(54) OPTICAL CHARACTER RECOGNITION SYSTEM HAVING CONTEXT ANALYZER

(75) Inventor: Raymond Amand Lorie, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1314 days.

(21) Appl. No.: 08/938,044

(22) Filed: Sep. 26, 1997

Related U.S. Application Data

(63) Continuation of application No. 08/325,849, filed on Oct. 18, 1994.

(51) Int. Cl.[7] ................................................. G06K 9/00
(52) U.S. Cl. ........................ 382/140; 382/321; 704/258
(58) Field of Search ................................ 382/155–161, 382/181, 185–190, 224–231, 317, 321, 312, 140; 364/822; 704/1–10, 231, 232, 259, 257, 258, 9; 706/1–12, 15, 16, 20, 25; 707/9

(56) References Cited

U.S. PATENT DOCUMENTS

| | | | | |
|---|---|---|---|---|
| 3,969,698 A | | 7/1976 | Bollinger et al. | 340/146.3 |
| 4,523,330 A | * | 6/1985 | Cain | 382/140 |
| 4,674,065 A | * | 6/1987 | Lange et al. | 382/311 |
| 4,979,227 A | | 12/1990 | Mittelbach et al. | 382/40 |
| 5,040,227 A | | 8/1991 | Lyke et al. | 382/7 |
| 5,151,948 A | | 9/1992 | Lyke et al. | 382/7 |
| 5,267,327 A | * | 11/1993 | Hirayama | 382/161 |
| 5,535,120 A | * | 7/1996 | Chong et al. | 364/419.03 |

OTHER PUBLICATIONS

A.C. Downton, E. Kabir and D. Guillevic, "Syntactic and Contextual Post–Processing of Handwritten Addresses for Optical Character Recognition", Pattern Recognition, 9th International Conference, 1988.*

Cohen, Computational Theory for Interpreting Handwritten Text in Constrained Domains, Elsevier, Artificial Intelligence 67, vol. 26, No. 1, Jul. 1994.

J. K. Mullin, InterfactingCriteria for Recognition Logic Used with a Context Post–Processor, Pattern Recognition Society, vol. 15, No. 3, pp. 271–273, 1982.

R. M. K. Sinha et al., Hybrid Contextual Text Recognition with String Matching, IEEE Transactions on Pattern Analysis and Machine Intelligence, vol. 15, No. 9, pp. 915–925, Sep. 1993.

From Card to MARC, Vine, No. 48, pp. 26–30, Mar. 1985.

Ong and Lee, Knowledge–based Contextual Processor for Text Recognition, IEEE, Computer Society Technical Committee on Pattern Analysis and Machine Intelligence, (Proceedings) p. 465, Mar. 1993.

Siddiqui et al., Using Contextual postprocessing to Improve Machine Recognition . . . IEEE Int. Symp. on Information Theory, Absts. of Papers, p. 37, Sep. 1983.

(List continued on next page.)

Primary Examiner—Jayanti K. Patel
(74) Attorney, Agent, or Firm—McGinn & Gibb, PLLC; Alison D. Mortinger, Esq.

(57) ABSTRACT

An optical character recognition (OCR) system is provided, in which syntactical and semantic rules, provided along with an input image to be scanned and applicable to the contents of the scanned image, are used in connection with the results of the OCR scan to identify the scanned characters. As a result, the recognition rate and confidence are enhanced. By providing the checking based on syntactical and semantic rules within the OCR system, application programs which would receive and use the OCR results are freed from the added burden of having to perform their own syntactical and/or semantic checking on the OCR results the application programs receive from the OCR system.

19 Claims, 3 Drawing Sheets

OTHER PUBLICATIONS

Houle et al., Use of a Priori Knowledge for Character Recognition, SPIE vol. 1661, pp. 146–156, 1992.

Downton et al., Syntactic and Contextual Post–Processing of a Handwritten Addresses for Optical Character Recognition, IEEE 9th Internat. Conf. on pattern Recognition, vol. II, pp. 1072–1076, Nov. 1988.

Baird et al., Components of an Omnifont Page Reader, IEEE 8th Internat. Conf. on Pattern Recognition, pp. 344–348, Oct. 1986.

Borgman et al., Getty's Synoname and Its Cousins: A Survey of Applications of Personal Name–Matching Algorithms, Journal of the American Society for Information Science, pp. 459–476, 1992.

Fukunaga et al., Recognition of Words with Semantic Information, Electronics and Communications in Japan, vol. 59–A, No. 1 1976.

T. G. Rose et al., A Large Vocabulary Semantic Analyzer for Handwriting Recognition, AISB Quarterly, No. 80. pp. 34–39.

Recognition Technologies Under Discussion, Electronic Documents, vol. 2, No. 9, pp. 12–16.

Lecolinet, A New Model for Context–Driven Word Recognition, Proc. 2nd Ann. Symp. on Document Analysis and Information Retrieval, pp. 135–145.

G. Farmer, Automated Data Capture & Deposit System Utilizes OCR for Hand–printed Tax Forms, IMC Journal, vol. 28, #2, Mar./Apr., pp. 23–26, 1992.

M. M. Lankhorst et al., Automatic Word Categorization: An Information–theoretic Approach, (paper), Univ. of Groningen, The Netherlands.

R. A. Wilkinson & C. L. Wilson, Using Self–Organizing Recognition as a Mechanism for Rejecting Segmentation Errors, SPIE vol. 1825, Intelligent Robots and Computer Vision XI (1992), pp. 378–388.

P. B. Cullen, T. K. Ho, J. J. Hull, M. Prussak & S. N. Srihari, Contextual Analysis of Machine Printed Addresses, SPIE vol. 1661 (1992), pp. 257–268.

* cited by examiner

| (.60) 2 | (.60) 1 | (.80) 3- | (.60) /9 | (.70) 9 |
|---------|---------|----------|----------|---------|
| (.30) 9- | (.40) / | (.20) 5 | (.20) 10 | (.20) 4 |
| (.10) 7 |         |          | (.20) 6  | (.10) 2 |

FIG. 2: OCR results for the Date field having representations of February 5, 1994.

| c1 | c2 | c3 | c4 | c5 |
|----|----|----|----|----|
| n  | n  | n- | /n | n  |
| n- | /  | n  | nn |    |
|    |    |    | n  |    |

FIG. 3: Possible types for characters of the Date field of FIG. 2

|          | c1 | c2 | c3 | c4  | c5 |
|----------|----|----|----|-----|----|
| syntax   | n  | /  | n  | / n | n  |
| choices  | 2  | /  | 5  | / 9 | 9  |
|          | 7  |    |    |     | 4  |
|          |    |    |    |     | 2  |

FIG. 4: Character choices for the first model based on the FIG. 2 results

|    | c1 | c2 | c3 | c4 | c5 | c6 |
|----|----|----|----|----|----|----|
|    | E  | R  | E  | J  | N  | Q  |
|    | F  | H  | F  | S  |    | G  |
|    |    |    |    |    | A  |    |

FIG. 5: Character choices for FRESNO

OPTICAL CHARACTER RECOGNITION SYSTEM HAVING CONTEXT ANALYZER

This is a continuation of copending application Ser. No. 08/325,849 filed on Oct. 18, 1994.

FIELD OF THE INVENTION

The invention generally relates to the field of optical character recognition (OCR). More particularly, the invention provides a method and system architecture for optical character recognition which employs syntax and semantics information relating to the characters to be recognized, to improve recognition accuracy and confidence.

BACKGROUND OF THE INVENTION

The problem at hand is to recognize the textual information contained in a scanned image. The scanned images can come from a wide variety of source material, such as written answers to printed questions on forms, or mailing addresses on postal envelopes.

OCR systems employ various strategies for isolating small portions of the image (such as groups of numeric digits within telephone numbers or ZIP codes) as connected components, segmenting a connected component into one or several character images and recognizing each such image as representing a specific character.

The process of OCR is prone to errors. Therefore an OCR system may be designed to identify several alternatives for segmenting a connected component, and several character choices for each character inside a segmentation alternative. The results are typically provided from the output of the OCR system to an application program, such as a text processor or a printer driver.

Conventional OCR recognition engines exist, which recognize characters with a reasonable accurracy. However, even a 90% accuracy rate at the character level means less than 50% at the word level, so over half of all words contain at least one error.

It is well known that the use of context information in conjunction with OCR helps to improve the level of accuracy realized. For instance, if a connected component is identified as a ZIP code (which consists only of numeric characters), then any character choice within the connected component which is not a numeric character can be dismissed as an incorrect choice.

In conventional systems, the OCR subsystem simply provides any character choices it recognizes to the application program, and the exploitation of context is performed by the application program. However, there are drawbacks in such an approach.

If an OCR system scans an image and outputs a single choice for each scanned character, then the application program can try alternate character values for well known confusion possibilities (i and 1, O and D, 3 and 5, etc.), or use a fuzzy search to find the best matching word in a dictionary. If the engine returns several choices, then the application program may try to find the most likely sequence of characters based on maximizing some total confidence estimate. But this is by no means an easy task; and it is inefficient use of programming resources to include, within application programs, the necessary logic and code for each particular application. Therefore, there is a need to relieve application programs of the responsibility for performing context-based checking of OCR results.

SUMMARY OF THE INVENTION

It therefore is an object of the present invention to provide an OCR system which performs its own context-based checking, to improve recognition accuracy.

To achieve this and other objectives, there is provided in accordance with the invention a system architecture for an OCR system including a general purpose, highly customizable, context analyzer. Once the initial scan of the input image to be recognized has been made, the tentatively identified characters are subjected to a context analysis, in which rules of syntax and semantics are applied in order to verify that the scanned characters are consistent with those rules, thereby improving the confidence level that the recognized characters are indeed correct.

Since the constraints are application-dependent, there is preferably a means for customizing the analyzer. In accordance with the invention, this is done through a language called Document Specification Language (DSL). A program, or "specification," written in the Document Specification Language specifies both the syntax and the semantics of the information to be recognized. DSL is specialized, concise, and non-procedural. Its inherent search mechanism makes it a high level language. Once a specification for a given type of text to be recognized is written in DSL, the specification can be compiled into an internal representation (the context structure).

While the invention is primarily disclosed as a system, it will be understood by a person of ordinary skill in the art that a method, such as a method executable on a conventional data processor, including a CPU, memory, I/O, program storage, a connecting bus, and other appropriate components, could be programmed or otherwise designed to facilitate the practice of the method of the invention. Such a method would include appropriate method steps for performing the invention. Also, an article of manufacture, such as a pre-recorded disk or other similar computer program product, for use with a data processing system, could include a storage medium and program means recorded thereon for directing the data processing system to facilitate the practice of the method of the invention. It will be understood that such apparatus and articles of manufacture also fall within the spirit and scope of the invention.

BRIEF DESCRIPTION OF THE DRAWINGS

FIG. 2 is a table of OCR results from scanning an input image of the character sequence 2/5/94, each column of the table corresponding with one of the connected components (94 being a single connected component), and each tabulated item representing a recognized character sequence and a corresponding probability-of-accurate-recognition measurement.

FIG. 3 is a table of possible character types (n representing a numeric, and - and / respectively representing a dash and a slash) produced from the tabulated items in the OCR scan results table of FIG. 2.

FIG. 4 is a table of character choices for the model 2/5/94, based on the OCR results given in FIG. 2.

FIG. 5 is a table of character choices for a scan of the city name FRESNO, which satisfied the syntax phase of the recognition method of the invention, and are to be used in the semantics phase thereof.

DESCRIPTION OF THE PREFERRED EMBODIMENT

Figure 1:
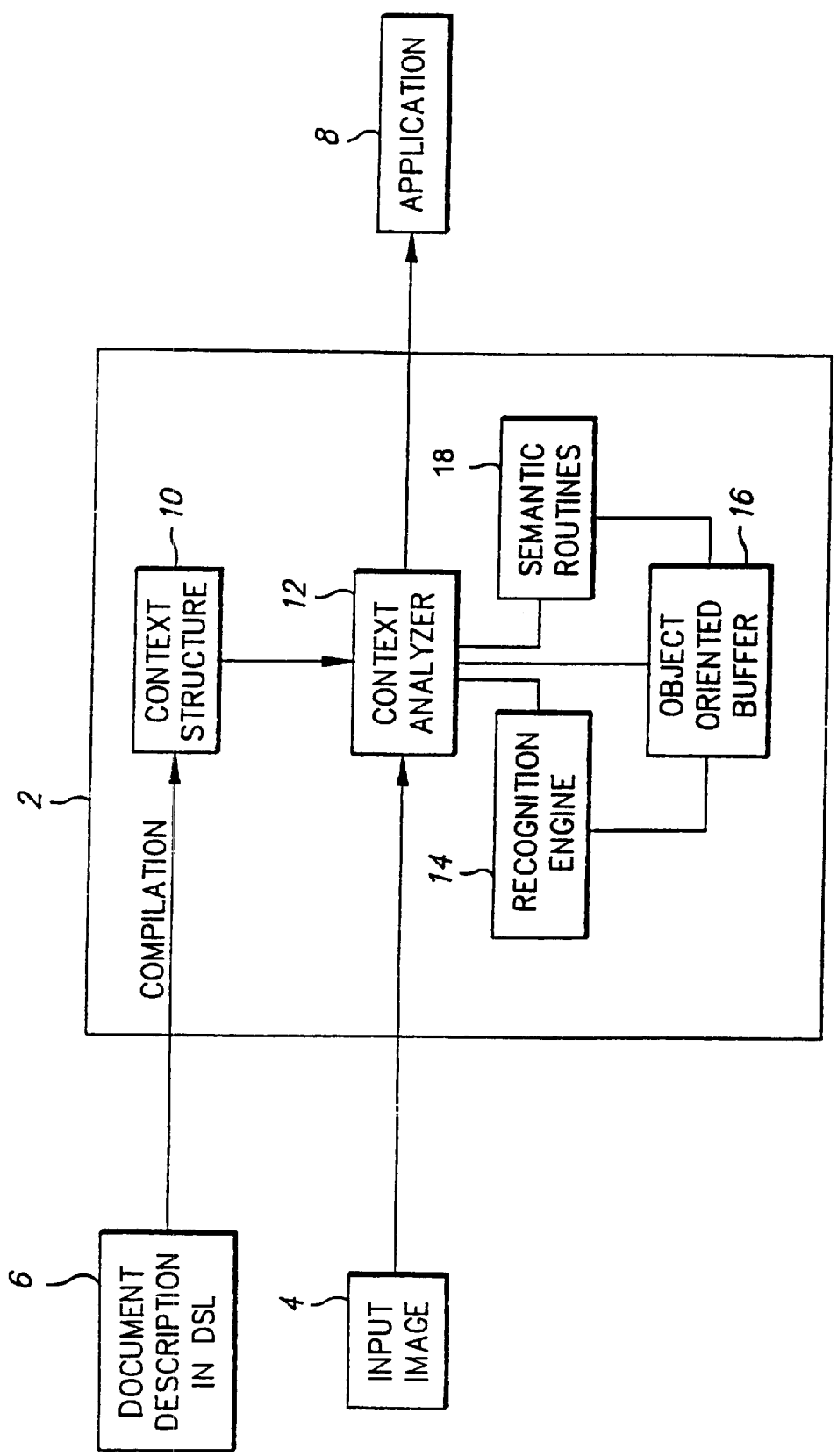
FIG. 1 is a system block diagram showing an OCR system in accordance with the invention, and an application program which is to work in concert with the OCR system.

FIG. 1 shows the general architecture of an OCR system in accordance with the invention, and its operating environment. The OCR system is generally shown as 2. The OCR system 2 receives as inputs an input image 4, containing an image of text to be recognized, and a document description 6. The image may be an array of image pixels produced by an image scanner in known fashion, or some other suitable representation of the character image. The document description 6 is preferably provided using the DSL, which will be described in detail below.

The document description is part of a predetermined text content constraint. More specifically, it includes syntax and semantics information with which the information in the input image is expected to conform. The document description is used to improve the accuracy of the OCR system's output in a manner to be described below.

The OCR system 2 performs optical character recognition on the input image 4, using the document description 6 to improve the accuracy of recognition, and provides the resultant recognized text as an output to an application program 8. The nature of the application program 8 is not essential to the invention. However, through the use of an OCR system in accordance with the invention, the application program 8 is relieved of the need to perform context based checking on the OCR results, thereby saving processing time as well as the application program designer's programming time. Additionally, the application program is less expensive to purchase or develop, because its capabilities need not include context-based checking of the results of the OCR.

The operation of the system of FIG. 1 works essentially as follows: Through a process of compilation, the document description 6 is compiled to produce a context structure 10, which is usable by the OCR system 2 in character recognition. The application program 8 invokes a context analyzer 12, within the OCR system 2, and directs the context analyzer 12 to access the context structure 10 and the input image 4.

The context analyzer 12 invokes a recognition engine 14, which may be any suitable device for performing OCR, such as a neural network, image processor, etc. Such recognition engines, which are known in the art, produce tokens which identify characters recognized (at least tentatively) in the scanned input image, and can also include confidence or probability measurements corresponding with the recognized characters.

The context analyzer 12 and the recognition engine 14 communicate through an object oriented buffer 16. The objects in the buffer are all character string variables identified by name.

Also, a set of semantics routines 18, for providing additional predetermined text content constraints which are used to increase the recognition accuracy, are provided. (Preferably, the semantics routines 18 include a suitable mechanism to include new user-defined routines. Many such mechanisms, such as system editors, are known.) The context analyzer 12 also accesses the semantic routines 18 through the object oriented buffer 16.

At execution time, the context analyzer 12 behaves like a parser. The recognition engine 14 produces tokens. The context analyzer 12 tries to match the tokens with the syntax specification expressed by the context structure 10, and makes sure that semantic constraints given in the semantic routines 18 are not violated. Since there may be several choices for a character (that is, a given input image might be recognized as either a 0, an O, or a Q), the parsing generally involves backtracking (known to those skilled in the art of OCR). When the recognition process completes, the application program 8 retrieves the recognized information from the object buffer 16.

At this point, it is useful to include the following two definitions, which are taken from the Webster's II New Riverside Dictionary (New York: Berkley Publishing Group, 1984), pp. 628, 698:

SYNTAX: the way in which words are put together to form sentences, clauses, and phrases.

SEMANTICS: 1. the study of meaning in language, esp. with regard to historical changes. 2. the study of the relationships between signs and symbols.

As will be seen from the discussion which follows, the syntax of the text being recognized, i.e., the sequence of alphas, numerics, punctuation marks, etc., will be used in a first phase of checking of the OCR results. The semantics, i.e., the existence of a recognized name within a dictionary of known valid names, the consistency between city name and ZIP code within that city, etc., will be used in a second phase of checking.

The details of the DSL language are not essential to the invention, but are examplified in a preferred implementation as follows. A DSL program has one FIELD statement for each field. A field is defined as a portion of the text which is expected to be found within a scanned text image, the portion having a known continuity. For instance, if addresses are to be scanned, the ZIP code would be one field of the address, and the continuity is the fact that five numeric digits make up a ZIP code. A FIELD statement has the following format:

FIELD field name field type field coordinates where the field name is a character string, the field type is actually the name of the type, and the field coordinates are four integers which delimit dimensions within the scanned image.

Here is an example of a FIELD statement for a certain field w1 which contains a ZIP code:

FIELD w1 ZIP 124, 1200, 150, 1400

TYPE INFORMATION

The type information, such as the ZIP code in the above example, must be known to the OCR system. It can be a basic alphabet, a defined alphabet, an elementary type, or a composite type. Elementary and composite types may exist in a predefined library, or be defined by the user, using the following facilities.

A basic alphabet is one of the following: NUM, UPPER_CASE, LOWER_CASE, etc.

An alphabet can also be defined in the DSL program by an ALPHABET statement containing the following items:

ALPHABET alphabet name alphabet definition where the alphabet definition is a union of basic alphabets and/or characters that belong to a given string. Here are a few examples of alphabet definitions:

ALPHABET hexadec (NUM, "ABCDEF")

ALPHABET octal ("01234567")

It will be recognized that, for instance, a hexadecimal alphabet includes the digits 0 through 9 and the letters A through F. Therefore, by using a predefined expression NUM to specify 0 through 9, and the individually specified letters A through F, the first of these two examples includes all sixteen hexadecimal digits.

ELEMENTARY and COMPOSITE types may be easily understood from their relationship to each other, elementary types generally being subsets of composite types. Each will be discussed separately.

First, consider several examples of elementary types. There are no two ways, or formats, of writing a 5-digit ZIP code such as 95120. That is, the only format in which a ZIP code is ever expected is simply five digits, with no intervening spaces or other characters.

Similarly, there are no two ways of writing elementary types taken alone, such as the digits of an area code (such as 408), the three-digit prefix or "exchange" of a telephone number (such as 927), or the extension of a telephone number (such as 3999). By contrast, now let us consider a few examples of composite types. There are several ways of writing a fill telephone number, such as (408) 927-3999. For example, 408-927-3999 or 408 9273999 may also be valid.

The strings 95120, 408, 927, 3999 can be seen as instances of elementary types, while the complete telephone number is an example of a composite type. An elementary type is defined by an ELEM_TYPE statement in the DSL program. Such a statement has the following format:

ELEM_TYPE type_name PHRASE or WORD name LENGTH COND.

where PHRASE and WORD are keywords which specify whether or not spaces are allowed, name specifies the alphabet to which characters in this field must belong, and LENGTH COND. is a condition such as LENGTH=5 or 6<=LENGTH<=9. Optionally, the name of a dictionary or routine may also be added at the end of the Statement.

For example, defining an elementary type for a ZIP code may be done as follows (temporarily disregarding the final name clause):

ELEM_TYPE ZIP WORD, NUM, LENGTH=5

Each composite type is defined by a TYPE statement in the DSL program. It has the following format:

TYPE name pairs list output where the second argument, "pairs", is a list of pairs of items. Each of the pairs in the list is given in the following format:

element name (element type)

describing the set of elements that compose this composite type. The third argument, "list", is a list of acceptable representation(s). The fourth argument, "output", is the representation to be used for the result string. Typically, the output representation will be a preferred, or frequently occurring, one of the acceptable representations, but for particular applications, some other suitable representation may be used as the output representation.

In this format, the representation is a sequence of element names and/or string constants. For example, the definition of a phone number as a composite type using three elementary types is given as follows (three elementary types followed by the composite type which includes the elementary types):

ELEM_TYPE area WORD, NUM, LENGTH=3
ELEM_TYPE prefix WORD, NUM, LENGTH=3
ELEM_TYPE ext WORD, NUM, LENGTH=4
TYPE phone a(area), p(prefix), e(ext)
REP "("a")" p "-" e
REP a p e
REP "("a")" p e
OUTPUT "("a")" p "-" e Note that the REP statements given in the composite TYPE statement are preferably ordered by order of likelihood of occurrence of the representations. The OUTPUT representation will be the one that the output string will have, independently of how the information was initially written. Thus, by having several different REP statements geared to recognizing different ways in which the composite type may be expressed, and a single OUTPUT statement, all strings recognized, regardless of format, will be output in the same format.

NAMING OF ELEMENTS

Since all fields are named, and since all elements inside a field are also named, each element in a field is uniquely identified by an expression specifying the field name "field name" and the element name "element name", for instance in the following form:

field_name.element_name

For example, using the above definition of the composite type "phone", one may define a field containing the home phone number as:

FIELD home_phone, phone . . .

Then, home_phone.area uniquely identifies the home area code.

DICTIONARIES AND ROUTINES

The definition of an elementary type, as shown above, may specify the name of a routine or dictionary to improve recognition. Routines are incorporated in the system from a system library or a user library. Their definition in C is always:

int routine_name (p_in, p_out)

where p_in points to the input information (a list of data elements, confidence, number of choices to be returned) and p_out points to the output information (choices and confidences). An integer returned is a 1 if there is a solution, 0 otherwise. Suppose, for example, that the validity of a number can be checked by invoking a routine rtn1. The Routine clause in the ELEM_TYPE statement will be:

ROUTINE rtn1

A routine may also modify the received data element.

Dictionaries are defined, using a DICTIONARY statement with the following format:

DICTIONARY dict_name (field_name_1) IN file_name

The argument of the IN portion of the DICTIONARY record identifies a location (such as a subdirectory) where the dictionary file resides. Here is an example of a DICTIONARY record, for a dictionary of first names:

DICTIONARY fstname (name) IN/dir/name1.dict

In this example, the dictionary would have the following format:

John
Peter
Mary

The format may also include an extra column containing the frequency of each entry, i.e., the frequency of occurrence of each of the first names in the dictionary.

The TYPE definition for a first_name would then refer to this dictionary as follows:

TYPE first_name WORD, . . . , DICT (fstname)

In this example, the dictionary context condition is associated with an elementary type. That is, first names are an elementary type because they do not come in a plurality of different formats (except, of course, for combinations of upper and lower case characters) However, dictionaries and routines can also be applied to a collection of elements. For example, suppose we have a dictionary with multiple columns, expressed in the following general format:

DICTIONARY dict_name (field_name_1, field_name_2, . . . ) IN file_name

The following is a concrete example of a dictionary containing address information that can be used in connection with scans of mailing addresses:

DICTIONARY address (state, ZIP, city) IN/dir1/dir2/my_addr.text

Items listed in the address dictionary would have the following format:

CA 95120 SAN_JOSE
NY 10010 NEW-YORK

Suppose, now, that three fields, designated w7, w8, and w9, are defined for state, ZIP code, and city. Then, one can associate with the last field w9 a CHECK statement, as follows:

CHECK w9 address (w7.state, w8.ZIP, w9.city)

that will enforce the constraints that the submitted arguments constitute a triple that is in the dictionary "address". That is, if an OCR scan of a text string identifies a city by name in part of the string, then any state and ZIP code information also identified elsewhere in the string must match one of the listings in the dictionary which include the identified city and any different valid states and ZIP codes.

THE CONTEXT ANALYZER

As mentioned earlier, the analyzer interprets the tokens returned by the recognition engine according to the constraints imposed by the DSL program. The overall problem may be couched in terms of a mathematical programming problem. Interpreting the complete document consists of receiving a set of choices provided by the OCR system from the input image, and picking up a certain OCR character choice and/or a certain syntactic or semantic alternative in the DSL specification. Any OCR choice has a certain probability, and therefore a solution (an acceptable sequence of decisions) has itself a probability obtained by combining the elementary probabilities of the choices.

If all possible combinations of choices are considered as possible solutions, such a method leads to a combinatorial explosion of different combinations. However, in accordance with the invention, special techniques are used to limit the explosion to a manageable number of combinations, and to increase performance.

To explain the overall functioning of the system, a simple execution algorithm which relies on controlled enumeration is used. The implementation will make sure that techniques such as branch and bound are used everywhere possible.

For example, let us consider the common numerical way of expressing the calendar date. The date February 5th, 1994 may be expressed as 2/5/94 or 2-5-94 (among others). Let us assume the following DSL specification:

ELEM_TYPE smalln WORD, NUM, LENGTH<=2
TYPE date (mm(smalln), dd(smalln), yy(smalln))
 REP (mm "/" dd "/" yy )
 REP (mm "-" dd "-" yy)
 OUTPUT (mm "/" dd "/" yy)
FIELD w6, date, . . .

together with a set of OCR results, which are shown in FIG. 2. In this DSL specification, the two REP statements define two representations of the date, which differ in that the delimiters are dashes and slashes, respectively.

The context analyzer processes the OCR results in two phases: Phase 1 handles syntactic constraints; Phase 2 takes care of semantic constraints.

PHASE 1: SYNTACTIC CONSTRAINTS

In its first phase, the algorithm utilizes syntactic constraints by essentially enumerating the (generally small number of) syntax models for a particular field. The following steps are used:

1. Determine the character types that are relevant to the syntax definition of the field.

In the present example, this essentially involves distinguishing between numeric characters (or connected components of more than one numeric characters) and delimiter characters, and determining which of the two delimiter characters (dashes and slashes) have been recognized.

2. Convert the character hypotheses returned by the recognition engine into the corresponding type hypotheses. For example, for dates as given above, the relevant types are numeric, dash and slash. Then, for each connected component (multiple digit dates, months, and years), the type hypotheses can be derived from the character hypotheses.

For example, FIG. 3 is a table of possible types which were hypothesized from the OCR results in FIG. 2. The dashes and slashes are as shown, and all numerics are represented by the letter n. In the right-most column of FIG. 2, the three numerics 9, 4, and 2 are possible choices. They are all single-digit numerics, and thus are represented by the single entry of n (representing a single-digit numeric) in the right-most column of FIG. 3. In the left-most column of FIG. 2, three possible choices were recognized, the two numerics 2 and 7, and the two-character sequence of 9-. Two entries are in the left-most column of FIG. 3: one with a single numeric digit n, representing the 2 and 7, and a numeric followed by a dash, representing the 9-.

3. Enumerate the possible models, starting with the most probable types.

In the example, the analysis yields a list of possible syntactic models that could match the OCR results while satisfying the syntactic constraints in the DSL specification. In this example, it happens that there is one possibly matching model for each of the two representations defined in the DSL specification, above.

For the first representation, the model is n/n/nn, and for the second representation, the model is n-nn-nn. Each of the two models are made possible because of the occurrence of dashes and slashes in the scanned results of FIG. 2, and the possible types of FIG. 3. Conversely, if there were, for instance, no slash along with the 9 at the top of the fourth column of FIG. 2, then the model for the first representation would not be available based on the characters as they exist in the OCR results. It would be possible, however, to go into another level of context analysis by interpreting the 1 in the 10, immediately below the /9 in the fourth column of FIG. 4, as a slash rather than a 1. This interpretation would then revive the model for the first representation.

The first representation is deemed more probable based on the probabilities given along with the individual OCR results which are consistent with the respective models.

4. Replace the types by the actual values. This operation is straightforward. FIG. 4 shows a set of actual character choices for the first syntax. For instance, the month digit was recognized as either a 2 or a 7, with 2 having a higher recognition confidence. The probabilities can be accumulated along the paths. The full set of solutions would yield 2/5/99, 2/5/94, 2/5/92, 7/5/99, 7/5/94, and 7/5/92. However, if we assume that we have no other a priori information on the dates, the best choice is obtained by simply picking up the best choice for each character, according to the confidence levels expressed in parentheses in FIG. 2, yielding 2/5/99. The same is done for the other valid syntaxes; global probabilities are used to choose the optimum.

However, if more a priori knowledge on the semantics of dates exists, Phase 2 will exploit it.

PHASE 2: SEMANTIC CONSTRAINTS

Let us suppose that the a priori knowledge is imbedded in a year routine that returns a Boolean expression, of value 1 if the year is valid and 0 if the year is invalid. Then, the DSL program is modified to include the semantic check, as follows ELEM_TYPE smalln WORD, NUM, LENGTH<=2
ELEM_TYPE year WORD, NUM, LENGTH<=2, "year"
TYPE date (mm(smalln), dd(smalln), yy(year))
  REP mm "/" dd "/" yy)
  REP mm "-" dd "-" yy)
  OUTPUT mm "/" dd "/" yy)
FIELD w6, date, . . .

Phase 2 is invoked as soon as a result for a single element (such as yy) is identified in the process step 4, discussed above. If the element is associated a semantic constraint (such as "year") the constraint is checked. If the constraint is satisfied, the value is accepted. Otherwise the process continues to find the best solution.

When the current representation has been matched, the results and their overall confidence levels are stored in the object buffer. When all representations have been processed, the best solution of all those accumulated is picked. In the example, the process unfolds as follows:

for the first rep: first and only syntax: n/n/nn replacement by characters: 2/5/99 semantic check:99 fails (assume the check is for past dates)

next hypothesis:94 semantic check: OK. Accept 2/5/94 store this hypothesis in the object buffer.

for the second rep: similar process. Accept 9-13-69

Pick up best.

GENERALIZATION

This concludes the discussion of the Date field (February 5, 1994) example. Now, more general cases will be considered. Essentially, the generalization goes in two directions:

1. Extension to handle dictionaries and routines that are not boolean.
2. Extension to multi-phase checking.

NON-BOOLEAN CHECKING

Until now we have only seen how boolean routines (returning 1 or 0) are exploited. In fact, the process explained above generates solutions made out of combinations of letters that exist in the OCR results.

In the non-boolean case, routines are considered which, from the OCR values, generate results by computation. Then, results may have characters that are not in the OCR choices. The use of a dictionary enters into that category.

Consider, for example, a form that is only used in the State of California, and which contains a field city. Assume its content for a particular form is 'FRESNO'. At the beginning of the semantic checking phase, sets are available, containing character choices, as shown in FIG. 5.

That whole set of characters can be passed to a fuzzy search routine that will find the best matching values in a dictionary.

MULTI-STAGE CHECKING

We now extend the example to a field that contains the city and the ZIP code: FRESNO 93650. It is clear that several semantic constraints are relevant: (1) Fresno must be a valid city name, (2) 93650 must be a valid ZIP code, and (3) last but not least, 93650 must be a ZIP code in Fresno.

That is where multi-stage checking comes in.
One possible solution is to write, in DSL:

| ELEM_TYPE ZIP | WORD, NUM, length = 5 |
| ELEM_TYPE city | PHRASE, my_string |

FIELD w2, city, . . .
FIELD w4, ZIP, . . .
CHECK DICT address (w2.city, w4.ZIP)

The syntax checking will unfold as explained before. Each of the two "FIELD" statements directs the syntax checking to take place, separately for the "city" and "ZIP" fields. The syntax checks will likely produce several possible solutions for each. The "CHECK" statement, which follows the two "FIELD" statements, performs semantic checks, using the choices of solutions for "city" and "ZIP", produced by the two "FIELD" statements. Preferably, the choices produced by the "FIELD" statements can simply accumulate in the object buffer until the "CHECK" statement utilizes them. Then the execution of CHECK will execute a fuzzy search that covers both city and ZIP.

The mechanism provides much flexibility. For example, another reasonable option is to accept only valid city names during the city checking (using a city dictionary), only valid ZIP codes during the ZIP checking, and then use a checking routine that picks up the best combination. The choice of alternative methods depend on the semantics. The needed flexibility is provided both by the language and the analyzer.

What follows is a high level pseudo code that describes the overall functioning of the context processor.

Context_Processor:
for each window
  for each representation
    find all syntactic models that satisfy the grammar (looking only at types);
    for each syntactic model
      for each data element in the model
        /* replace by actual characters */
        if no semantic, use most probable chars only;
        if semantic is delayed (until CHECK with dict)
          save OCR results in Object buffer (OB);
        if semantic through dict for elem type
          invoke search routine with OCR results;
        if other semantic on individual element
          consider next character combination (and stack position);
          if satisfies semantics, accept and go on with next data element;
          else backtrack to get next combination;
      After last data element
        save solution in OB
          (keep only the n best where n can be specified);
        backtrack to try next choice;
      When no backtracking left
        loop to handle next syntactic model;
    When no syntactic model left
      loop to handle next representation;
  When last representation, loop to handle next window;
When last window, end;
CHECK_with_dictionary:
  use info stored in OB to find the best dictionary entries and updates OB.
  For each "column" in the dictionary, the initial info is OCR result choices or set of values (see parsing algorithm above).

CHECK_with_routine:
  always use data elements that have been identified during the parsing.

THE OBJECT BUFFER

Earlier, the object buffer was described as a simple mechanism to pass values of named variables. However, semantic checking, as explained above, requires more information about the values and confidence of the OCR engine. It also relies on the capability of changing a result or a set of results available for a subsequent stage of checking.

The recognition engine puts its results in the buffer as a specific predetermined structure. The preferred structure is defined hierarchically as follows: The structure is set up in terms of fields. A field includes a sequence of connected components. A connected component includes a set of options. An option is a sequence of elementary patterns. A pattern is a set of possible characters.

Similarly, the temporary and final results of the context processor, produced as described above, are also stored in the buffer.

Finally, semantic routines can get data from the buffer; they can also update the buffer by changing values, reducing a set of hypotheses to a single one or even replace a single value by a set for further checking and selection.

SUMMARY

An architecture has been disclosed for context checking in OCR. It is centered on a Document Specification Language. Document description languages have been used for a long time as a means of communication, and mainly to help formatting. Here, DSL is geared towards helping recognition.

The system organization allows for sharing many functions among applications:
1. it factors out the central mechanism of choosing among choices,
2. it provides a uniform mechanism for invoking semantic routines, and
3. it provides a unified mechanism for interchanging the kind of data involved in the recognition process.

Once such a framework is used, it is expected to trigger the development of some library of DSL functions, very much like classes in an object-oriented programming language. The results will be more striking because the universe of types is much more restricted. The same thing will be true for some important semantic routines. A first example is a fuzzy search of a dictionary.

The following are some details regarding the implementation of the invention. Some components were initially implemented as ad hoc routines for processing some tax forms, credit applications and other forms. But, very quickly, the amount of ad hoc code proved to be substantial, and an implementation of an operational system was made, based on a somewhat simplified version of the proposal, in which process optimization was disregarded. This simplification did not adversely impact the ability to handle the above applications which were the primary objective of the invention.

Here are some preliminary results from evaluating the implementation of the invention. Note that the recognition rates are at the field level, not the character level:
  telephone number (10 digits)
  syntactic checking ONLY:
  field recognition rate increases from 28% to 44%
  single word dictionary lookup
  (last name, incomplete dictionary)
  recognition rate increases from 9% to 27%
  multi-field dictionary lookup
  (city, state, ZIP)
  recognition rate increases:
    from 8% to 60% for city
    from 18% to 64% for state
    from 28% to 50% for ZIP code For the experiments that produced these results, the quality of the images was poor, so that the OCR engine would produce a relatively low recognition rate. The experiment does, however, illustrate the efficiency of the context analyzer, in terms of the increase in percentages given above.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. An optical character recognition (OCR) system comprising:
  means for producing a scan of an input image of text to be recognized;
  a context analyzer coupled to receive the scan, for checking the scan for consistency with a predetermined text content constraint, the predetermined text content constraint including a syntactical constraint and a semantic constraint;
  user input means for accepting user-selected text content constraints, including a character-based syntactical constraint and a character-based semantic constraint, the user input means including a document specification language which serves as a user interface to allow the user to enter the user selected text content constraints;
  syntax means for checking the preliminary scan for consistency with the character-based syntactical constraint; and
  semantics means for checking the preliminary scan for consistency with the character-based semantic constraint.

2. An OCR system as recited in claim 1, wherein the semantics means is operative responsive to completion of operation of the systax means.

3. An OCR system as recited in claim 1, wherein:
  the syntax means includes:
    (i) means for receiving a document description, programmed in the document specification language, pertaining to the text to be recognized, and
    (ii) means for compiling the document description to produce a context structure; and
  the context analyzer includes means for checking the preliminary scan for consistency with the context structure.

4. An OCR system as recited in claim 1, wherein:
  the semantics means includes a library of semantic routines; and
  the context analyzer includes means for checking the preliminary scan for consistency with the semantic routines.

5. An OCR system as recited in claim 4, further comprising means for facilitating modification of the library of semantic routines by a user of the OCR system.

6. An OCR system as recited in claim 1, wherein the document specification language includes instructions for defining at least one of:
  (i) a field within the text to be recognized,
  (ii) a character type for characters occurring within the field,
  (iii) an alphabet, and
  (iv) a representation of a sequence of characters in terms of types of the characters of the sequence.

7. An OCR system as recited in claim 1, further comprising an object oriented buffer coupled to the context analyzer for passing values of variables.

8. An OCR system as recited in claim 1, wherein:
  the OCR system further comprises a dictionary containing a set of valid text items; and
  the context analyzer includes means for performing a fuzzy search through the dictionary to identify best matching values, among the text items.

9. An OCR system as recited in claim 1, wherein:
  the OCR system includes a plurality of dictionaries containing sets of valid text items for respective fields of the text to be recognized; and the context analyzer includes:
    (i) means for performing respective fuzzy searches through the dictionaries to identify best matching values, among the text items, for respective fields of the text to be recognized, and
    (ii) means for comparing the best matching values of the respective fuzzy searches to identify a best combination of the best matching values.

10. An OCR system as recited in claim 1, further comprising:
  a recognition engine coupled to the context analyzer for performing an initial character recognition procedure on the image; and
  an object oriented buffer coupled to the recognition engine for receiving and storing results of the initial character recognition procedure in a predetermined structure, for storing results of the context analyzer, and for providing updatable data to the semantic means.

11. The OCR system in claim 1, wherein said text comprises numerical and alphabetic words, each including at least one character, said character-based syntactical constraint and said character-based semantic constraint comprising formatting and logical constraints on said characters.

12. The OCR system in claim 1, wherein said text comprises numerical and alphabetic words, each including at least one character, said character-based syntactical constraint and said character-based semantic constraint comprising input field controls of said characters.

13. The OCR system in claim 1, wherein a logical operation of said context analyzer is uneffected by said user input means.

14. A method for performing optical character recognition (OCR) on an image to recognize text in the image, the method comprising the steps of:
  receiving, as a user input, syntax and semantic definitions of an expected content of the field of the image, the user input being given in terms of user-selected text content constraints, including a character-based syntactical constraint and a character-based semantic constraint, the step of receiving including receiving the user-selected text content constraints expressed in a user-programmable document specification language which serves as a user interface to allow the user to enter the user-selected text content constraints;

using the character-based syntactical constraint to determine character types that are relevant to the syntax definitions of the field;

operating a recognition engine on the image to produce character hypotheses of a content of the image, and probability values for the character hypotheses;

converting the character hypotheses into a character type hypotheses;

using the character-based semantic constraint to enumerate possible models for the image content based on the character type hypotheses and on the probability values;

replacing the character type hypotheses with character values to produce a set of solutions; and selecting one of the solutions as the recognized text.

15. The method in claim 14, wherein said text comprises numerical and alphabetic words, each including at least one character, said character-based syntactical constraint and said character-based semantic constraint comprising formatting and logical constraints on said characters.

16. The method in claim 14, wherein said text comprises numerical and alphabetic words, each including at least one character, said character-based syntactical constraint and said character-based semantic constraint comprising input field controls of said characters.

17. A computer program product, for use with a processing system, for directing the processing system to perform optical character recognition (OCR) on an image to recognize text in the image, the computer program product comprising:

a recording medium;

means, recorded on the recording medium, for directing the processing system to receive, as a user input, syntax and semantic definitions of an expected content of the field of the image, the user input being given in terms of user-selected text content constraints, including a character-based syntactical constraint and a character-based semantic constraint, the means for directing to receive including a document specification language which serves as a user interface to allow the user to enter the user-selected text content constraints;

means, recorded on the recording medium, for directing the processing system to use the character-based syntactical constraint to determine character types that are relevant to the syntax definitions of the field;

means, recorded on the recording medium, for directing the processing system to operate a recognition engine on the image to produce character hypotheses of a content of the image, and probability values for the character hypotheses;

means, recorded on the recording medium, for directing the processing system to convert the character hypotheses into a character type hypotheses;

means, recorded on the recording medium, for directing the processing system to use the character-based semantic constraint to enumerate, possible models for the image content based on the character type hypotheses and on the probability values;

means, recorded on the recording medium, for directing the processing system to replace the character type hypotheses with character values to produce a set of solutions; and means, recorded on the recording medium, for directing the processing system to select one of the solutions as the recognized text.

18. The computer program product in claim 17, wherein said text comprises numerical and alphabetic words, each including at least one character, said character-based syntactical constraint and said character-based semantic constraint comprising formatting and logical constraints on said characters.

19. The computer program product in claim 17, wherein said text comprises numerical and alphabetic words, each including at least one character, said character-based syntactical constraint and said character-based semantic constraint comprising input field controls of said characters.

* * * * *